R. B. OMAN.
WELDING TORCH.
APPLICATION FILED OCT. 13, 1919.
1,419,168.
Patented June 13, 1922.
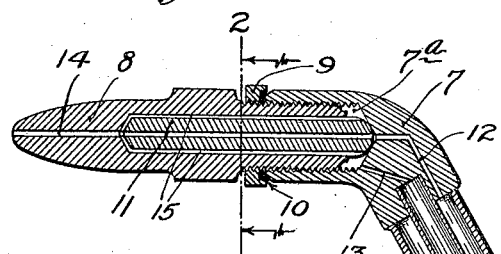
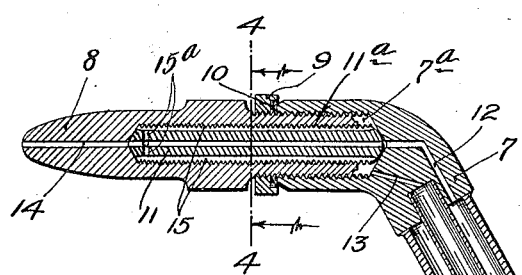
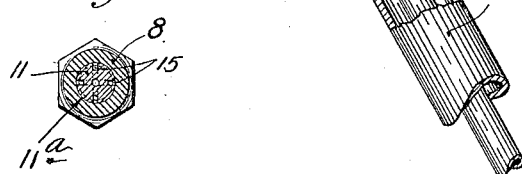
Inventor
Reuben B. Oman
By his Attorneys

UNITED STATES PATENT OFFICE.

REUBEN B. OMAN, OF WILLMAR, MINNESOTA.

WELDING TORCH.

1,419,168.    Specification of Letters Patent.    Patented June 13, 1922.

Application filed October 13, 1919. Serial No. 330,252.

*To all whom it may concern:*

Be it known that I, REUBEN B. OMAN, a citizen of the United States, residing at Willmar, in the county of Kandiyohi and State of Minnesota, have invented certain new and useful Improvements in Welding Torches; and I do hereby declare the following to be a full, clear, and exact description of the invention, such as will enable others skilled in the art to which it appertains to make and use the same.

My invention has for its object to provide an improved welding torch; and to such ends, generally stated, the invention consists of the novel construction and combination of parts hereinafter described and defined in the claims.

Torches of the type herein designated as welding torches, are, as is well known, designed to deliver at the burning point, two gases, such as oxygen and acetylene, or oxygen and hydrogen, or sometimes air and acetylene. Back firing in these torches is not only undesirable, but dangerous and should be avoided. In my improved torch, I eliminate back firing by using small conduits for the delivery of the two gases through the head of the torch, and by arranging these conduits to commingle the two gases only at a point close to the discharge end of the burner tip.

The improved torch is illustrated in the accompanying drawings wherein like characters indicate like parts throughout the several views. Referring to the drawings:—

Fig. 1 is a view showing the torch in axial section, some parts being left in full;

Fig. 2 is a section on the line 2—2 of Fig. 1;

Fig. 3 is a view corresponding to Fig. 1, but illustrating a slightly modified construction; and Fig. 4 is a section on the line 4—4 of Fig. 3.

The torch and its handle is, of course, a portable device. The handle portion of the torch is made up of two quite long concentrically spaced pipes 5 and 6, both of which are rigidly connected to an elbow-like head 7 at one end. As shown, the inner and smaller pipe 6 is seated within the head 7 and welded thereto, while the outer and larger pipe 5 is seated against and welded to the end of the head 7. The extended end of the head 7 is internally threaded, and the externally threaded shank of the torch tip 8 is screwed into the same and locked thereto by a nut 9. Preferably, packing 10 is placed between the nut 9 and the end of the head 7 to insure a gas-tight joint between the head and tip.

The tip 8 has an axial bore that receives and closely fits a tubular core 11. The axial passage through the core 11 is small and, at its rear end, registers in a small gas conduit 12 formed with the head 7 and leading to the annular chamber between the two pipes 5 and 6. The rear end of core 11 is rounded or otherwise formed so that it makes a gas-tight joint with the rear wall of chamber $7^a$ of head 7. Chamber $7^a$ is nearly filled by the threaded end of tip 8, but there is a small gas chamber left surrounding the projecting rear end of core 11, and this chamber is in communication with the interior of inner pipe 6, through a small gas conduit 13.

Burner tip 8 is provided with an axial discharge conduit 14 that is aligned with the outer end of the axial passage through core 11. Core 11 is formed with a plurality of longitudinal external gas conduits or channels 15 that lead from chamber $7^a$ and, at the inner end of core 11, are extended radially inward, so that they commingle with the discharge conduit 14 of tip 8.

In practice, inner pipe 6 has usually been connected to the supply of acetylene gas under pressure, and the outer pipe 5 has been connected to the supply of oxygen under pressure. With this arrangement, the oxygen gas will be delivered through the axial passage of core 11, while the acetylene gas will be delivered through the external grooves of said core, and the two gases will be commingled only as they pass through the conduit 14 of tip 8.

This arrangement not only gives a highly efficient burner during the burning action, but practically insures against back firing. Back firing cannot well take place through very small passages, and moreover, explosion of any considerable size cannot take place in chambers of small holding capacity. Here it should be noted that even the chamber $7^a$ has very small holding capacity. The axial discharge passage 14 of tip 8 should be considerably larger than the axial passage of core 11, so that it will take care of the delivery of the two gases from the exterior and from the interior of the said core. Nevertheless, the said passage 14 is also a small passage.

This improved burner may, moreover, be cheaply made, easily assembled and is highly efficient and durable.

When the tip 8 is screwed in as far as it will go, the ends of bushing 11 will, of course, be tightly pressed in the one instance against the interior of the head 7, and in the other, against the interior of the tip 8.

The construction illustrated in Figs. 3 and 4 is like that shown in Figs. 1 and 2, with the exception that the bushing 11 is externally threaded at 11$^a$ and is screwed into the interior of tip 8. The channels 15 have inwardly radiating passages 15$^a$ that are positioned slightly to the rear of the forward end of the bushing 11$^a$. This arrangement more positively holds the core to the tip when the latter is removed, but the operation of both devices is the same.

What I claim is:

1. A welding torch having in combination a head having oxygen and acetylene inlet passages therein, a threaded bore in the front part of said head, the former passage disposed in the axial line of said bore, a tip threaded into said bore and having a small axial opening extending some distance from its front end and communicating with a larger opening extending for the remainder of its length, a core member having a small axial passage, and a plurality of longitudinal peripheral passages disposed in the said larger opening of the tip member, the rear end of the core contacting the head with its axial passage in alinement and in close proximity to the oxygen inlet passage, and the front end in alinement with the smaller opening of the tip, the longitudinal peripheral passages communicating with the acetylene inlet passage in said head and also in communication with the bore in said head at its rear end.

2. A welding torch having in combination a head, concentrically arranged oxygen and acetylene pipes connected thereto, the inner pipe carrying acetylene which will be cooled by the oxygen which is carried in the outer pipe, a tip member and a core member, said core member having an axial passage for oxygen throughout its length and separated longitudinal peripheral passages for acetylene throughout its length, said longitudinal passages joining said axial passage at a point adjacent the tip end and said tip having a small axial opening extending from said point to its front end whereby back firing is prevented.

3. A burner comprising a head member, a tip member threaded thereinto, a core member of uniform diameter clamped between the head and tip members and having therein an axial oxygen passage and a plurality of separated longitudinal peripheral acetylene passages extending throughout its length.

4. A welding torch having in combination a head having an opening therein, a tip member threaded in said opening and comprising a chamber, a core member fitting in said chamber and clamped therein between the front end of the same and said head, said tip having a small bore extending from its front end, said core having a smaller substantially central bore alined with the bore of said tip and also having a plurality of separate peripheral longitudinally extending passages communicating at the front end with the bore in said tip and communicating at their rear end with the opening in said head, said opening communicating with an acetylene supply passage in said head, the rear end of the central bore in the core communicating with an oxygen supply passage in said head.

In testimony whereof I affix my signature.

REUBEN B. OMAN.